(12) United States Patent
Matsuno et al.

(10) Patent No.: US 9,809,164 B2
(45) Date of Patent: *Nov. 7, 2017

(54) TRAVEL CONTROL APPARATUS FOR VEHICLE

(71) Applicant: SUBARU CORPORATION, Tokyo (JP)

(72) Inventors: Koji Matsuno, Tokyo (JP); Harunobu Horiguchi, Tokyo (JP); Shiro Ezoe, Tokyo (JP); Takayuki Nagase, Tokyo (JP); Hajime Oyama, Tokyo (JP); Yasushi Takaso, Tokyo (JP); Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/739,705

(22) Filed: Jun. 15, 2015

(65) Prior Publication Data

US 2015/0360684 A1  Dec. 17, 2015

(30) Foreign Application Priority Data

Jun. 17, 2014  (JP) .................................. 2014-124786

(51) Int. Cl.
*G01C 22/00* (2006.01)
*G05D 1/00* (2006.01)
(Continued)

(52) U.S. Cl.
CPC ......... *B60Q 9/00* (2013.01); *B60W 30/18163* (2013.01); *B60W 2550/30* (2013.01); *B60W 2550/402* (2013.01)

(58) Field of Classification Search
CPC ........... B60W 30/18154; B60W 50/14; B60W 30/16; B60W 30/165; B60W 50/085;
(Continued)

(56) References Cited

U.S. PATENT DOCUMENTS 6,138,062 A    10/2000  Usami
6,353,788 B1 *  3/2002  Baker ................ B60K 31/0008
                                                   340/435

(Continued)

FOREIGN PATENT DOCUMENTS

JP    10-31799 A    2/1998
JP  2008-110695 A   5/2008

(Continued)

OTHER PUBLICATIONS

Notification of Reasons for Refusal Japanese Patent Application No. 2014-124786 dated Jul. 5, 2016 with English translation.

(Continued)

*Primary Examiner* — Jelani Smith
*Assistant Examiner* — Luis A Martinez Borrero
(74) *Attorney, Agent, or Firm* — McDermott Will & Emery LLP

(57) ABSTRACT

A travel control apparatus for a vehicle detects a vehicle to be passed that is an target of passing and is located in front of a vehicle equipped with the travel control apparatus in a traveling lane thereof on the basis of peripheral environment information and travel information, detects a following vehicle that is behind the vehicle in the traveling lane thereof as a following vehicle in the original lane on the basis of the peripheral environment information, monitors the vehicle to be passed and the following vehicle in the original lane, and variably controls a passing maneuver with respect to the vehicle to be passed on the basis of a monitoring result.

15 Claims, 11 Drawing Sheets

(51) Int. Cl.
*B60Q 9/00* (2006.01)
*B60W 30/18* (2012.01)

(58) Field of Classification Search
CPC ............... B60W 30/143; B60W 50/08; B60W 2420/52; B60W 30/0956; B60W 2550/402; B60W 2550/308; B60W 2420/403; B60W 2550/304; B60Q 2300/41; B60Q 2300/42; B60Q 1/143; B60Q 9/008; B60Q 2900/30; B60Q 1/0088; B60Q 2300/054; B60Q 2300/3321; B60Q 2300/45; B60Q 2300/112; B60Q 2300/144; B60Q 2300/122; B60Q 2300/337
USPC ....... 701/1, 23, 41, 28, 36, 301, 37, 70, 117, 701/408, 101, 25, 26, 45, 2, 116, 123, 21
See application file for complete search history.

(56) References Cited

U.S. PATENT DOCUMENTS

| | | | | | |
|---|---|---|---|---|---|
| 8,583,329 | B2* | 11/2013 | Breed | ............... | B60R 21/0134 180/167 |
| 8,983,706 | B2* | 3/2015 | Hartmann | ............ | B60W 10/06 701/23 |
| 9,469,296 | B2* | 10/2016 | Nilsson | ............. | B60W 10/18 |
| 9,550,528 | B1* | 1/2017 | Hakeem | ............. | B62D 15/025 |
| 2003/0236602 | A1* | 12/2003 | Kuge | ................ | B60T 17/18 701/36 |
| 2005/0134440 | A1* | 6/2005 | Breed | ................ | B60N 2/2863 340/435 |
| 2007/0293996 | A1* | 12/2007 | Mori | .................. | G01C 21/005 701/23 |
| 2008/0162010 | A1* | 7/2008 | Klotz | ............... | B60K 31/0008 701/93 |
| 2008/0201050 | A1* | 8/2008 | Placke | .............. | B60W 10/06 701/70 |
| 2010/0117813 | A1* | 5/2010 | Lee | ..................... | B60W 40/04 340/435 |
| 2011/0234390 | A1* | 9/2011 | Danner | .............. | B60T 8/17557 340/438 |
| 2012/0154591 | A1* | 6/2012 | Baur | ...................... | B60R 1/00 348/148 |
| 2013/0338878 | A1* | 12/2013 | Fritz | ................... | B60W 10/18 701/41 |
| 2014/0172221 | A1* | 6/2014 | Solyom | ............. | B62D 15/0285 701/23 |
| 2014/0207325 | A1* | 7/2014 | Mudalige | ............ | B62D 15/025 701/26 |
| 2015/0057835 | A1* | 2/2015 | Streubel | ............ | B60W 30/0953 701/1 |
| 2015/0120124 | A1* | 4/2015 | Bartels | .................. | B60W 50/10 701/23 |
| 2015/0142207 | A1* | 5/2015 | Flehmig | .......... | B60W 30/18163 701/1 |
| 2015/0154871 | A1* | 6/2015 | Rothoff | .................... | G08G 1/22 701/2 |
| 2015/0166062 | A1* | 6/2015 | Johnson | ................ | B60W 30/12 701/41 |
| 2015/0258990 | A1* | 9/2015 | Stettner | ................. | G01S 17/023 701/37 |
| 2015/0274178 | A1* | 10/2015 | Tsuyunashi | ......... | B60W 30/095 701/36 |
| 2015/0321699 | A1* | 11/2015 | Rebhan | .................... | B60Q 9/00 701/23 |
| 2015/0353087 | A1* | 12/2015 | Niino | .................... | B60W 30/16 701/96 |
| 2015/0353094 | A1* | 12/2015 | Harda | ............. | B60W 30/18163 701/23 |
| 2015/0360721 | A1* | 12/2015 | Matsuno | ............. | B62D 15/0255 701/41 |
| 2015/0367854 | A1* | 12/2015 | Ezoe | ..................... | B60W 30/14 701/1 |
| 2016/0023598 | A1* | 1/2016 | Kohler | .................. | G01S 13/931 340/435 |
| 2016/0059858 | A1* | 3/2016 | Heinrich | ......... | B60W 30/18163 701/23 |
| 2016/0063858 | A1* | 3/2016 | Schmudderich | ...... | B60W 40/04 701/117 |
| 2016/0114811 | A1* | 4/2016 | Matsuno | ........... | B60W 50/0225 701/23 |
| 2016/0121906 | A1* | 5/2016 | Matsuno | ................ | B60K 28/10 701/23 |
| 2016/0152182 | A1* | 6/2016 | Aoki | ..................... | B60W 50/14 340/435 |
| 2016/0194003 | A1* | 7/2016 | Torii | ..................... | B60W 30/16 701/23 |
| 2016/0318518 | A1* | 11/2016 | Suzuki | ........... | B60W 30/18163 |
| 2016/0362113 | A1* | 12/2016 | Takaso | .................. | B60W 10/18 |

FOREIGN PATENT DOCUMENTS

| | | |
|---|---|---|
| JP | 2009-023399 A | 2/2009 |
| JP | 2009-248892 A | 10/2009 |

OTHER PUBLICATIONS

Notification of Reasons for Refusal Japanese Patent Application No. 2014-124786 dated Feb. 23, 2016 with English translation.

* cited by examiner

TRAVEL CONTROL APPARATUS FOR VEHICLE

CROSS-REFERENCE TO RELATED APPLICATIONS

The present application claims priority from Japanese Patent Application No. 2014-124786 filed on Jun. 17, 2014, the entire contents of which are hereby incorporated by reference.

BACKGROUND

1. Technical Field

The present invention relates in particular to a travel control apparatus for a vehicle whereby another vehicle in front in the same lane can be passed by automatic travel technology.

2. Related Art

In recent years, various devices have been developed and proposed in which automatic driving technology is used in a vehicle so as to allow a driver to perform safe and pleasant driving. For example, Japanese Unexamined Patent Application Publication (JP-A) No. 2009-248892 discloses a travel control system, in which the suitability of passing a preceding vehicle is determined by a vehicle equipped with the travel control system on the basis of a traveling state of the vehicle and the preceding vehicle. When it is determined that passing of the preceding vehicle is suitable, a passing preparation operation is performed. Then, when it is recognized, on the basis of the travel environment and traveling state of the vehicle and the preceding vehicle, for instance, that the vehicle and the preceding vehicle are traveling along on a lane of a road having multiple lanes in each direction, there are no traffic lights and/or intersections or the like within a predetermined distance range in front, there are no other preceding vehicles in the passing path, and there is no following vehicle which might enter into the passing path, it is determined that passing of the preceding vehicle is possible, and passing is performed.

According to the technology of the travel control system according to JP-A No. 2009-248892, passing is performed in accordance with the travel environment (presence/absence of intersections and traffic lights), and preceding vehicles in the passing path, when the vehicle is seeking to perform a passing maneuver, and therefore it is possible to achieve a safe passing maneuver. However, passing a preceding vehicle which is the target of passing involves performing a complex combination of driving operations, such as lane changing in order to implement passing, accelerating after lane changing, and lane changing back to the original lane after the acceleration for passing. There are cases where, for instance, it is desirable not to perform the passing maneuver, depending on the traveling state of a following vehicle, or where it is desirable to return to the original lane without passing the preceding vehicle, even after lane changing for passing, and the passing maneuver must be performed by predicting these situations accurately.

SUMMARY OF THE INVENTION

The present invention was devised in view of these circumstances, an object thereof being to provide a travel control apparatus for a vehicle in which, when implementing passing control using automatic driving technology, if it is desirable not to perform a passing maneuver, or it is desirable for the vehicle to return to the original lane without passing the preceding vehicle, even after lane changing in order to implement passing, for instance, due to the traveling state of a following vehicle, this information is gathered suitably, and the driver can be duly notified or the vehicle can automatically perform lane changing back to the original lane.

An aspect of a travel control apparatus for a vehicle according to the present invention includes: a peripheral environment recognition unit that detects peripheral environment information on peripheral environment in which a vehicle equipped with the travel control apparatus is traveling; a travel information detection unit that detects travel information on travel of the vehicle; a vehicle to be passed detection unit that detects a vehicle to be passed on the basis of the peripheral environment information and the travel information, the vehicle to be passed being a target of passing located in front of the vehicle in a traveling lane thereof; a following vehicle in original lane detection unit that detects a following vehicle behind the vehicle in the traveling lane thereof, as a following vehicle in an original lane, on the basis of the peripheral environment information, the original lane being the traveling lane; a passing control unit that monitors the vehicle to be passed and the following vehicle in the original lane, and variably controls a passing maneuver with respect to the vehicle to be passed, on the basis of a monitoring result; and a notification unit that issues a notification about a control status performed by the passing control unit.

BRIEF DESCRIPTION OF THE DRAWINGS

FIGS. 9A and 9B are illustrative diagrams of travel control during monitoring of a following vehicle in the original lane in the first-stage and second-stage accelerations in FIG. 4, in which FIG. 9A shows a case of returning behind the following vehicle in the original lane and FIG. 9B shows a case of returning behind the vehicle to be passed, according to the example;

DETAILED DESCRIPTION

An example of the present invention is described hereinafter with reference to the drawings.

Figure 1:
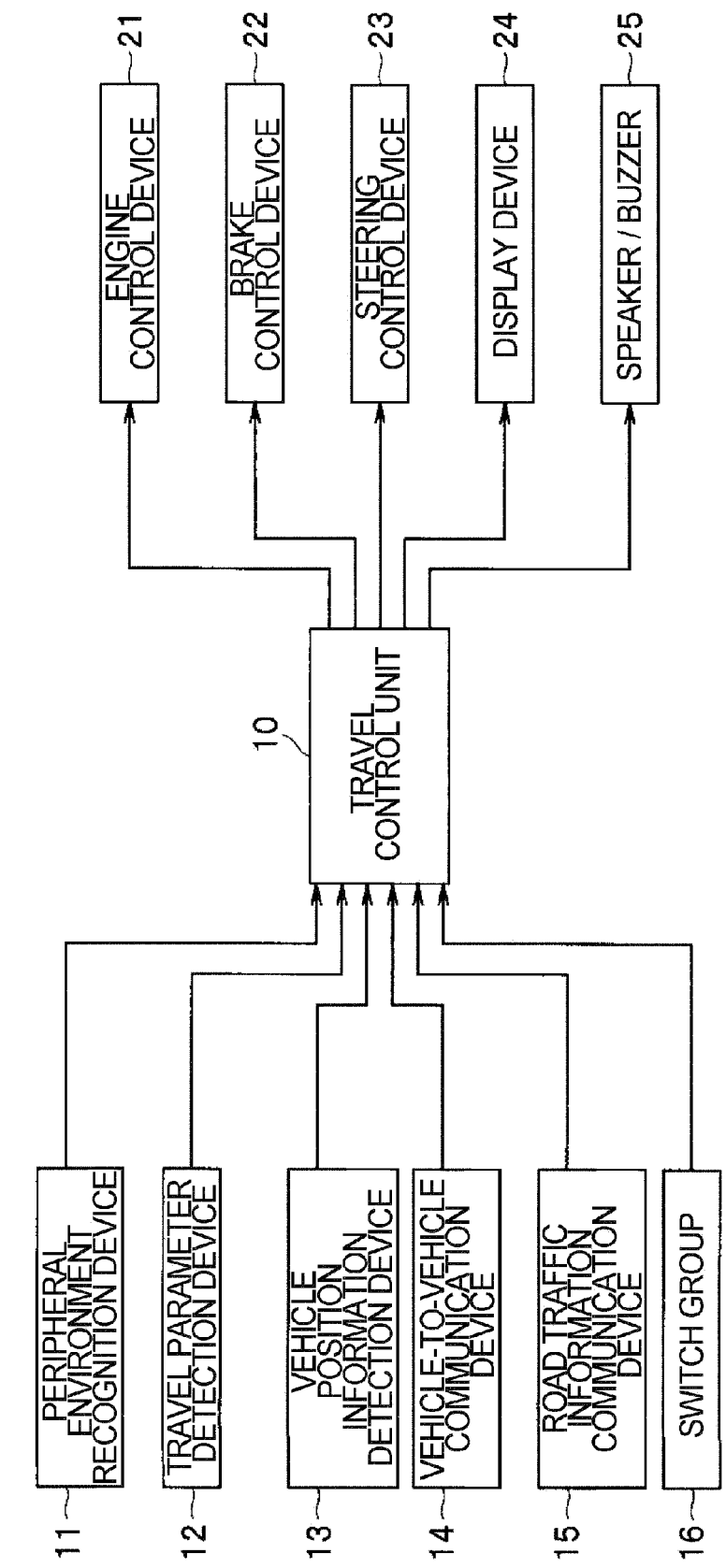
FIG. 1 is a general schematic drawing of a travel control apparatus for a vehicle according to an example of the present invention.

In FIG. 1, reference numeral 1 indicates a travel control apparatus for a vehicle. In the travel control apparatus 1, various input devices, such as a peripheral environment recognition device 11, a travel parameter detection device 12, a vehicle position information detection device 13, a vehicle-to-vehicle communication device 14, a road traffic information communication device 15 and a switch group 16, and various output devices, such as an engine control device 21, a brake control device 22, a steering control device 23, a display device 24 and a speaker/buzzer 25, are connected to a travel control unit 10.

The peripheral environment recognition device 11 includes a camera device (stereo camera, single-eye camera, color camera, or the like; not illustrated) provided with a solid-state imaging element, or the like, which is disposed inside a vehicle cabin of a vehicle equipped with the travel control apparatus 1 (hereinafter referred to as "subject vehicle") and acquires image information by capturing images of the external environment of the vehicle, and a radar device (laser radar, milliwave radar, ultrasonic radar, or the like; not illustrated) that receives reflected waves from objects present in the periphery of the vehicle.

On the basis of the image information captured by the camera device, the peripheral environment recognition device 11 performs a well-known grouping process in accordance with distance information, for example, and by comparing the grouped distance information with predetermined three-dimensional road shape data and object data, etc., extracts the relative position (distance and angle) from the subject vehicle of lane line data, side wall data for guard rails and kerbs, etc. located alongside the road, and object data for vehicles and the like, together with the velocity.

Furthermore, the peripheral environment recognition device 11 detects the positions (distance and angle) in which reflecting objects are present, together with the velocity, on the basis of the reflected wave information acquired by the radar device. In this way, the peripheral environment recognition device 11 is provided as the peripheral environment recognition unit of the appended claims in this example.

The travel parameter detection device 12 detects the traveling state of the subject vehicle, and more specifically, a vehicle velocity V, an accelerator opening degree θth, a road surface gradient Ug of a road surface on which the vehicle is traveling (an uphill gradient is indicated by "+"), and an estimated road surface coefficient of friction μe, and the like. In this way, the travel parameter detection device 12 is provided as the travel information detection unit of the appended claims in this example.

The vehicle position information detection device 13 is a well-known navigation system, for example. The vehicle position information detection device 13 receives, for example, radio waves transmitted from a Global Positioning System (GPS) satellite, detects a current position on the basis of the radio wave information, and specifies the subject vehicle position on map data that is previously stored on a flash memory, compact disc (CD), digital versatile disc (DVD), Blu-ray (registered trademark) disk, hard disk drive (HDD), or the like. The previously stored map data includes road data and facilities data. The road data includes information on the position and type of links, information on the position and type of nodes, and information on node and link connection relationships. The facilities data has a plurality of records for each facility, and each record includes name information on the facility in question, current position information, and facility type information (department store, shop, restaurant, parking place, public park or vehicle repair garage). Thereupon, when the subject vehicle position is displayed on the map and a destination point is input by an operator, a path from a departure point to the destination point is calculated in a predetermined manner and shown on the display device 24, such as a display panel and monitor, whereby guidance can be provided by voice instructions by the speaker/buzzer 25.

The vehicle-to-vehicle communication device 14 includes a narrow-band wireless communication device having a communication area of approximately 100 [m], such as a wireless LAN, and performs direct communications with other vehicles without routing via a server, or the like, and can thereby transmit and receive information. Two-way communications with other vehicles are made to exchange vehicle information, travel information, traffic environment information, and the like. The vehicle information includes specific information indicating a vehicle type (in the example, type information such as passenger vehicle, truck, and two-wheeled vehicle). The travel information includes vehicle velocity, position information, brake lamp lighting information, blinking information of turn-signal lamps emitted when turning right or left, and blinking information of hazard lamps that blink when a vehicle makes an emergency stop. The traffic environment information includes information that varies in accordance with circumstances, such as road congestion information and road works information.

The road traffic information communication device 15 is a so-called "Vehicle Information and Communication System (VICS)" (registered trademark) that receives in real time road traffic information on congestion, accidents, road works, required travel times and parking places, from an FM multiplex broadcast and/or transmitters on the roadway, and displays the received traffic information on the previously stored map data described above.

The switch group 16 includes switches relating to driving assistance control for the driver, such as a switch for implementing travel control to set the velocity to a predetermined constant velocity, a switch for implementing tracking control to keep the distance or time to a preceding vehicle at a predetermined constant value, a switch for implementing lane deviation prevention control for preventing deviation from the traveling lane, a switch for lane keeping control to keep the vehicle in a set traveling lane, a passing control implementation permission switch for enabling the implementation of passing control in relation to a preceding vehicle (vehicle to be passed), a switch for setting the vehicle velocity, vehicle-to-vehicle distance, vehicle-to-vehicle time, speed limit, and the like, required for each of these controls, and a switch for cancelling these controls.

The engine control device 21 is, for example, a well-known control unit that implements principal controls relating to the engine (not illustrated) of the vehicle, such as fuel injection control, ignition timing control, control of an electronically-controlled throttle valve, and the like, on the basis of the intake air volume, the throttle opening degree θth, the engine water temperature, the air intake temperature, the oxygen concentration, the crank angle, the accelerator opening degree θacc, and other vehicle information. The engine control device 21 receives from the travel control unit 10 a target acceleration $(d^2X/dt^2)t$ and/or target velocity V2, and an instruction to change the characteristics of the throttle opening degree θth in accordance with the accelerator opening degree θacc.

Examples of the brake control device 22 include a well-known antilock brake System and a well-known control unit that implements sideslip prevention control. The brake control device 22 is capable of controlling the brake devices (not illustrated) of the four wheels independently of a braking operation by the driver, on the basis of the brake switch, the wheel velocities of the four wheels, the steering wheel angle, the yaw rate, and other vehicle information, and thereby implementing well-known an anti-lock brake system and/or lateral slip prevention, and the like. When a deceleration instruction, or the like, is output from the travel control unit 10, the brake control device 22 implements braking control in accordance with the deceleration instruction value.

The steering control device 23 is, for example, a well-known control device that controls an assistance torque provided by an electric power steering motor (not illustrated) provided in the steering system of the vehicle, on the basis of the vehicle velocity V, steering torque, steering wheel angle, yaw rate, and other vehicle information, for example. The steering control device 23 is capable of lane keeping control to keep the vehicle in a set traveling lane, and lane deviation prevention control for preventing deviation from the traveling lane, and is composed so as to implement control by calculating the steering angle or steering torque required for the lane keeping control and lane deviation prevention control. When implementing passing maneuver control, the target steering wheel angle θHt required for passing the vehicle to be passed or for returning to the original lane, is input to the steering control device 23 from the travel control unit 10. In this way, the steering control device 23 is provided as the steering control unit of the appended claims in the example.

The display device 24 is, for example, a device that issues a visual warning or notification to the driver, such as a monitor, display panel, and warning lamp. The speaker/buzzer 25 is a device that issues an audible warning or notification to the driver, and the display device 24 and the speaker/buzzer 25 are provided as the notification unit of the appended claims in the example.

The travel control unit 10 recognizes the traveling lane of the subject vehicle (original lane when lane changing is performed), a lane that is adjacent to the travelling lane of the subject vehicle (original lane) and to which the subject vehicle performs lane changing in order to pass the vehicle to be passed (hereinafter referred to as "passing lane"), and the like, together with positional information, on the basis of respective input signals from the various devices 11 to 16 described above. The travel control unit 10 also recognizes a preceding vehicle in the traveling lane of the subject vehicle, and a pre-preceding vehicle in front of the preceding vehicle, and recognizes, for example, the preceding vehicle in the traveling lane of the subject vehicle as a vehicle to be passed. Moreover, the travel control unit 10 recognizes a following vehicle that is traveling behind the subject vehicle in the traveling lane of the subject vehicle as a following vehicle in the original lane. For each of the preceding vehicle, the pre-preceding vehicle in front of the preceding vehicle, the vehicle to be passed, the following vehicle in the original lane, information such as distance information from the subject vehicle, relative velocity information, velocity information that incorporates the velocity of the subject vehicle, blinking information of the turn-signal lamps, and other information, is detected based on image information, radar transmission/reception information, vehicle-to-vehicle communications, and the like. Then, for example, when a passing control implementation input has been made via the switch group 16, passing maneuver control with respect to the vehicle to be passed is performed using the automatic driving technology.

Figure 2:
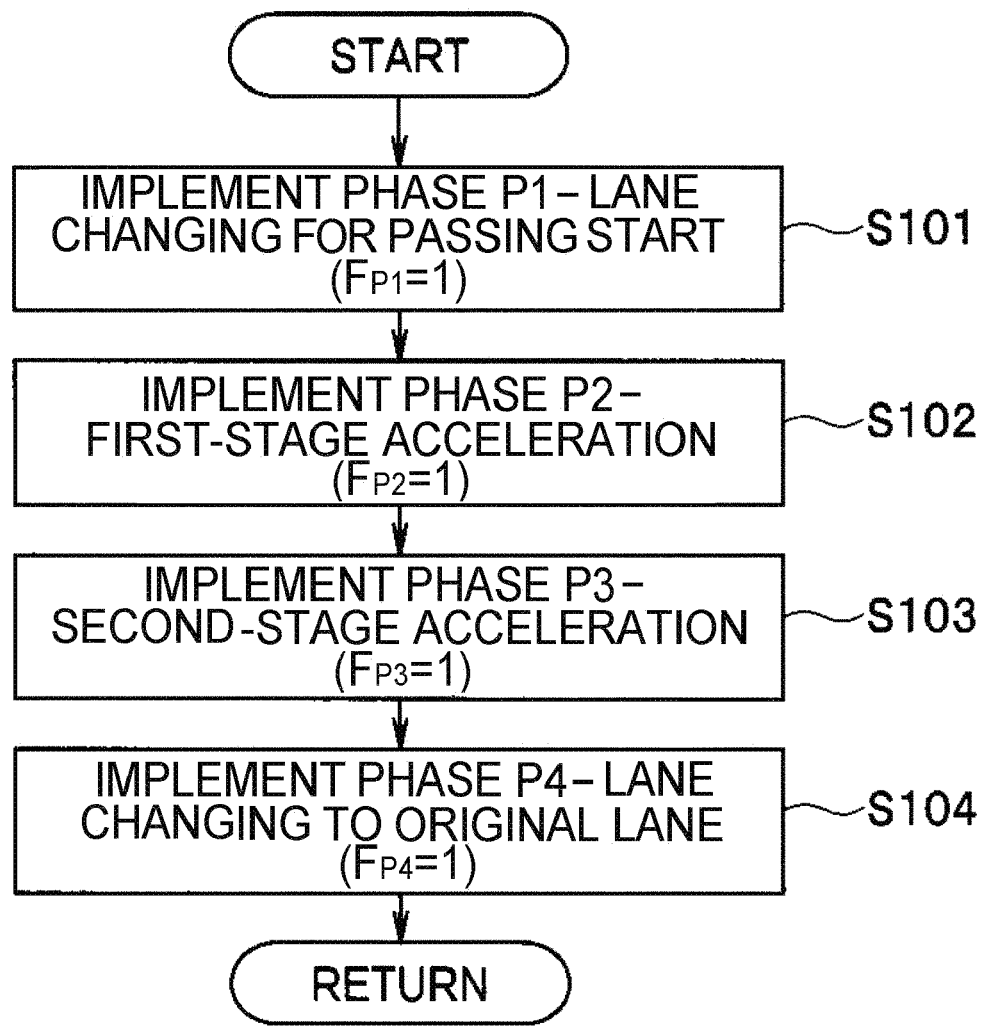
FIG. 2 is a flowchart of a passing travel control program according to the example.
Figure 7:
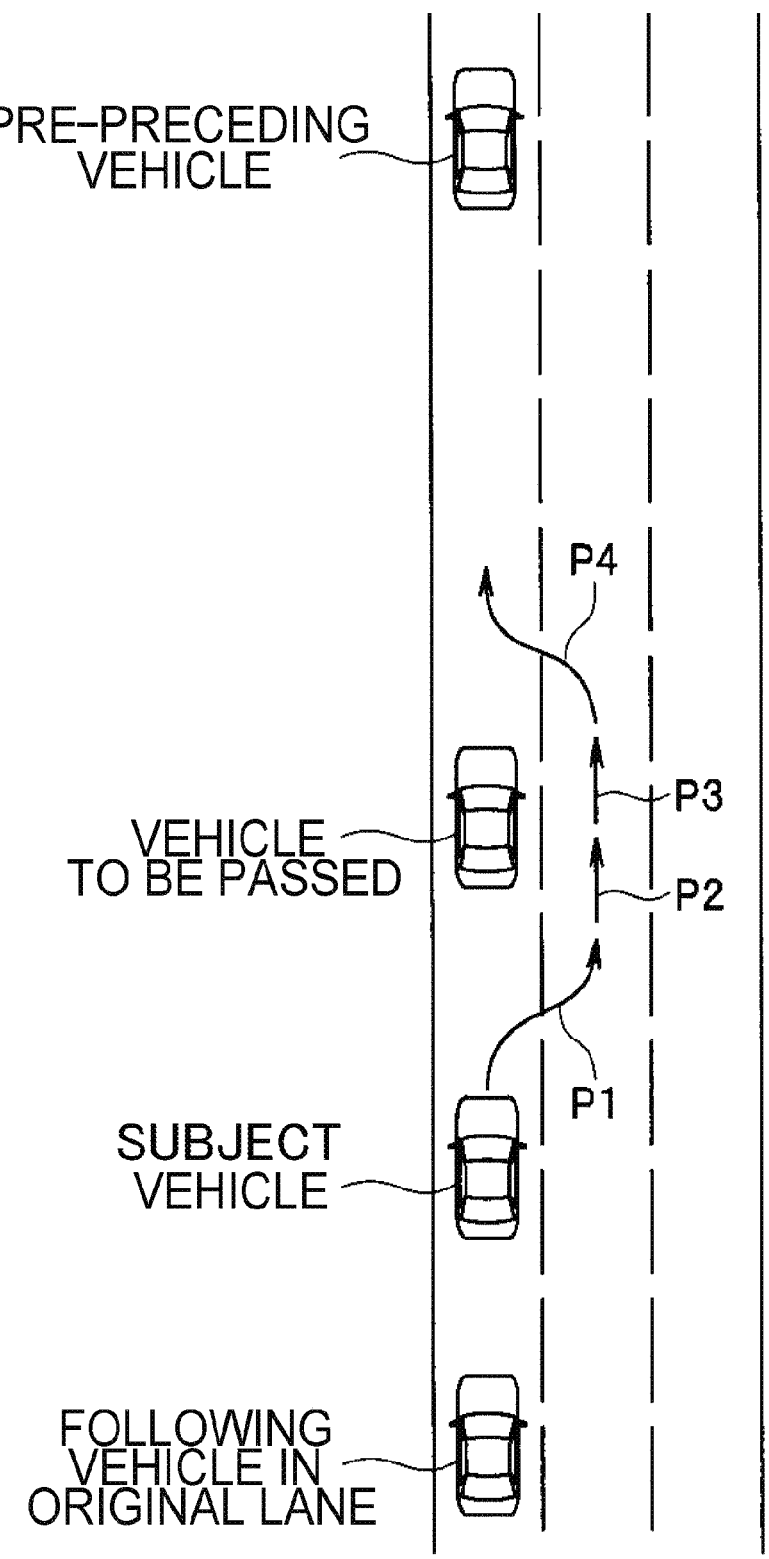
FIG. 7 is an illustrative diagram of respective phases of passing travel control according to the example.

In the travel control unit 10 according to the example, the passing maneuver control is performed in four phases that are a phase P1 in which lane changing is performed for passing start, a phase P2 in which first acceleration is performed, a phase P3 in which second acceleration is performed, and a phase P4 in which lane changing is performed to return to the original lane, as illustrated in the flowchart in FIGS. 2 and 7. The control in each of these phases is described below.

FIG. 2 is a flowchart showing an overall program for passing maneuver control, and firstly, in step 101 (hereinafter, step is abbreviated to "S"), the phase P1 illustrated in FIG. 7 is implemented. While the travel control unit 10 is implementing the phase P1, a flag Fp1 is that indicates that lane changing for passing start is under progress set (Fp1=1).

In the example, the vehicle trajectory when the subject vehicle performs lane changing is obtained, for example, by a normalized polynomial for a minimum-jerk $(\int d^3y/dx^3)$ trajectory, using two-dimensional coordinates in which the travel distance is the x direction and the amount of lateral movement (lane changing width) is the y direction.

In this case, the following equations are satisfied, y(0)=0, y(1)=1, dy(0)/dx=$d^2$y(0)/d$x^2$=0, dy(1)/dx=$d^2$y(1)/d$x^2$=0, and Equation (1) below is obtained.

$$y = 6 \cdot x^5 - 15 \cdot x^4 + 10 \cdot x^3 \quad (1)$$

Equations (2), (3), (4) are derived by differentiating Equation (1).

$$dy/dx = 30 \cdot (x^4 - 2 \cdot x^3 + x^2) \quad (2)$$

$$d^2y/dx^2 = 60 \cdot (2 \cdot x^3 - 3 \cdot x^2 + x) \quad (3)$$

$$d^3y/dx^3 = 60 \cdot (6 \cdot x^2 - 6 \cdot x + 1) \quad (4)$$

If the value of x when $d^3y/dx^3 = 0$ is reverse calculated by Equation (4) above, then Equation (5) below is obtained.

$$x(d^3y/dx^3 = 0) = (3 \pm 3^{1/2})/6 \quad (5)$$

From this value of x, $d^2y/dx^2$ is calculated by Equation (3), and if this value is taken to be the absolute value of the maximum lateral acceleration $|(d^2y/dx^2)max|$, then the value in (6) below is obtained.

$$|(d^2y/dx^2)max| = 10 \cdot 3^{1/2}/3 \approx 5.77 \quad (6)$$

Furthermore, when the maximum lateral acceleration upon lane changing $(d^2Y/dt^2)$ max_c (a previously set value) is represented with the maximum value $(d^2y/dx^2)$ max of the lateral acceleration described above, the following equation (7) is obtained, taking the travel distance required to lane changing as L, and taking the lane changing width as W.

$$(d^2y/dx^2)max \cdot W/(L/V)^2 = (d^2Y/dt^2)max\_c \quad (7)$$

If Equation (7) is resolved for the travel distance L, then Equation (8) below is obtained.

$$L = (5.77 \cdot W \cdot V^2/(d^2Y/dt^2)max\_c)^{1/2} \quad (8)$$

From this Equation (8), the distance L1 required for the phase P1 is resolved in Equation (9) below, taking the vehicle velocity V in this case to be V1.

$$L1=(5.77 \cdot W \cdot V1^2/(d^2Y/dt^2)\max\_c)^{1/2} \quad (9)$$

Furthermore, when the estimated value of the normalized travel distance of the subject vehicle in the x direction is taken to be xe, then $$xe=(\int V \cdot dt)/L \quad (10).$$

The relationship between the target yaw rate γt, the vehicle velocity V and the lateral acceleration $(d^2y/dx^2)$ is expressed in Equation (11) below, and therefore the target yaw rate γt is given by Equation (12) below, using Equation (3) described above.

$$\gamma t \cdot V=(d^2y/dx^2) \cdot W/(L/V)^2 \quad (11)$$

$$\gamma t=60 \cdot (2 \cdot xe^3-3 \cdot xe^2+xe) \cdot W \cdot V/L^2 \quad (12)$$

By substituting this target yaw rate γt into the relationship (Equation (13)) for the target steering wheel angle θHt indicated below, the target steering wheel angle θHt required for control (as output to the steering control device 23) is obtained.

$$\theta Ht=\gamma t \cdot n/G\gamma \quad (13)$$

Here, n is the steering gear ratio, Gγ is the yaw rate gain, and this yaw rate gain Gγ can be calculated by Equation (14) below, for example.

$$G\gamma=(1/(1+A \cdot V^2)) \cdot (V/1) \quad (14)$$

Here, A is the stability factor which is unique to the vehicle, and l is the wheelbase.

In this way, in the P1 in S101, the target steering wheel angle θHt is calculated by Equation (13) described above, automatic steering control is applied, and the vehicle travels the distance L1 indicated in Equation (9) described above. The values V1 and L1 are used respectively for the vehicle velocity V and distance L that are required in order to calculate the target steering wheel angle θHt.

In the example, the vehicle trajectory when the subject vehicle performs lane changing is determined by a normalized polynomial expression for a minimum-jerk trajectory, but the invention is not limited to this and the trajectory may be approximated by another curve function, or the like.

When the phase P1 in S101 has ended and lane changing has been completed, the phase P2 illustrated in FIG. 7 is implemented in S102. While the travel control unit 10 is implementing the phase P2, a flag Fp2 hat indicates that first acceleration is under progress is set (Fp2=1).

This phase P2 is travel control for accelerating in the passing lane until the subject vehicle catches up with and travels substantially parallel with the vehicle to be passed, and the travel distance L2 in the phase P2 can be calculated, for example, by Equation (15) below.

$$L2=(\tfrac{1}{2} \cdot (d^2X/dt^2)t)) \cdot (V2^2-V1^2) \quad (15)$$

Here, V2 is the target vehicle velocity after the acceleration for passing and is, for example, either one of the following values, whichever is smaller: the velocity Vf of the vehicle to be passed plus a predetermined velocity (in other words, a (target) relative velocity when passing) ΔV, namely, (Vf+ΔV); and a limit velocity Vlim (a predetermined velocity limit or the velocity limit for the road as recognized by the various input signals indicated above).

$(d^2X/dt^2)$ t is the target acceleration for passing and is set, for example, by Equation (16) below.

$$(d^2X/dt^2)t=\min((d^2X/dt^2)0-Kg \cdot Ug, \mu e \cdot g) \quad (16)$$

Here, min is a minimum function that selects $((d^2X/dt^2)0-Kg \cdot Ug)$ or $(\mu e \cdot g)$, whichever is smaller, $(d^2X/dt^2)0$ is a predetermined reference value for the acceleration for passing, Kg is the road surface gradient coefficient, and g is the acceleration due to gravity.

When the phase P2 is ended in S102, the travel control unit 10 advances to S103 where the phase P3 illustrated in FIG. 7 is implemented. While the travel control unit 10 is implementing the phase P3, a second-stage flag Fp3 that indicates that second acceleration is under progress is set (Fp3=1).

This P3 is travel control for accelerating in order for the vehicle to return to the original lane after traveling in the passing lane substantially parallel with the vehicle to be passed, and the travel distance L3 in the phase P3 can be calculated, for example, by Equation (17) below.

$$L3=(Lp-(1/(2 \cdot (d^2X/dt^2)t)) \cdot (V2-V1)^2) \cdot V2/(V2-V1) \quad (17)$$

Here, Lp is a value obtained by adding a target vehicle-to-vehicle distance after passing, to the vehicle-to-vehicle distance between the subject vehicle and the vehicle to be passed.

When the P3 is ended in S103, the travel control unit 10 advances to S104 where the phase P4 illustrated in FIG. 7 is implemented. When the travel control unit 10 implements the phase P4, a flag Fp4 that indicates that lane changing is under progress to return to the original lane is set (Fp4=1).

This phase P4 involves control that is implemented until the subject vehicle has passed the vehicle to be passed in the passing lane and has returned to the original lane. Therefore, when the travel distance L4 in this phase P4 is obtained by a normalized polynomial expression for a minimum-jerk trajectory, for example, the travel distance L4 is calculated by Equation (18) below, from Equation (8) described above.

$$L4=(5.77 \cdot W \cdot V2^2/(d^2Y/dt^2)\max\_c)^{1/2} \quad (18)$$

The target steering wheel angle θHt required for control (as output to the steering control device 23) is calculated by using V4 and L4 respectively for the vehicle velocity V and distance L, on the basis of Equation (13) described above. Consequently, the travel distance Lr based on passing control implemented by the travel control unit 10 according to the example is L1+L2+L3+L4.

Then, the travel control unit 10 monitors the vehicle to be passed and a following vehicle in the original lane. In either one of the cases where control for passing the vehicle to be passed has started (in the case of the phase P1), and where lane changing has been performed (in the case of the phase P2), the travel control unit 10 implements control for suspending a passing maneuver, when at least either one of the following situations is detected: there is a large change in the relative velocity of the following vehicle in the original lane with respect to the subject vehicle, in a direction in which the following vehicle is approaching to the vehicle; and a the vehicle in the original lane intends to perform lane changing in the same direction as the subject vehicle performs lane changing in order to pass the vehicle to be passed.

Figure 3:
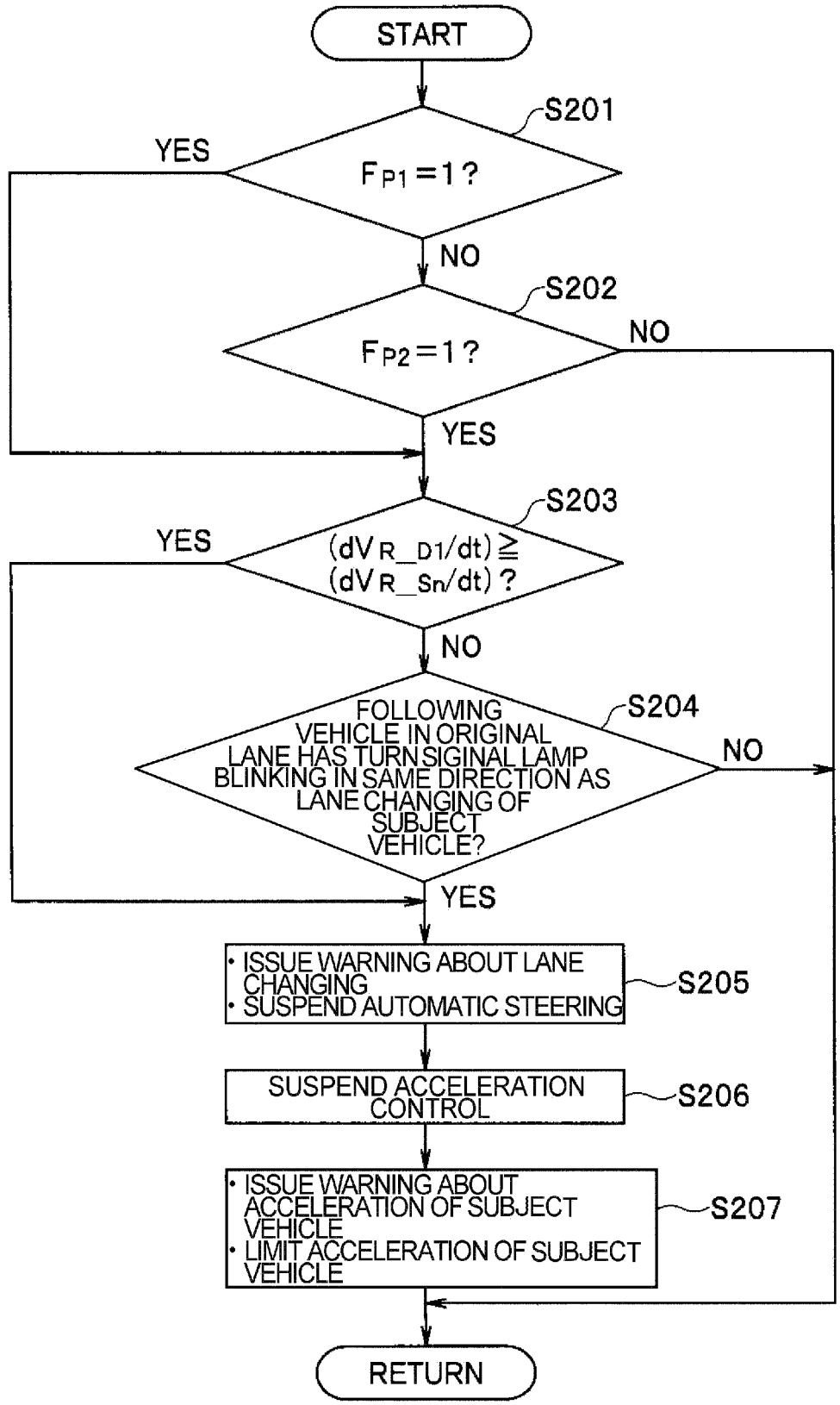
FIG. 3 is a flowchart of travel control during monitoring of a following vehicle in the original lane, during lane changing for passing start and first-stage acceleration, according to the example.
Figure 8:
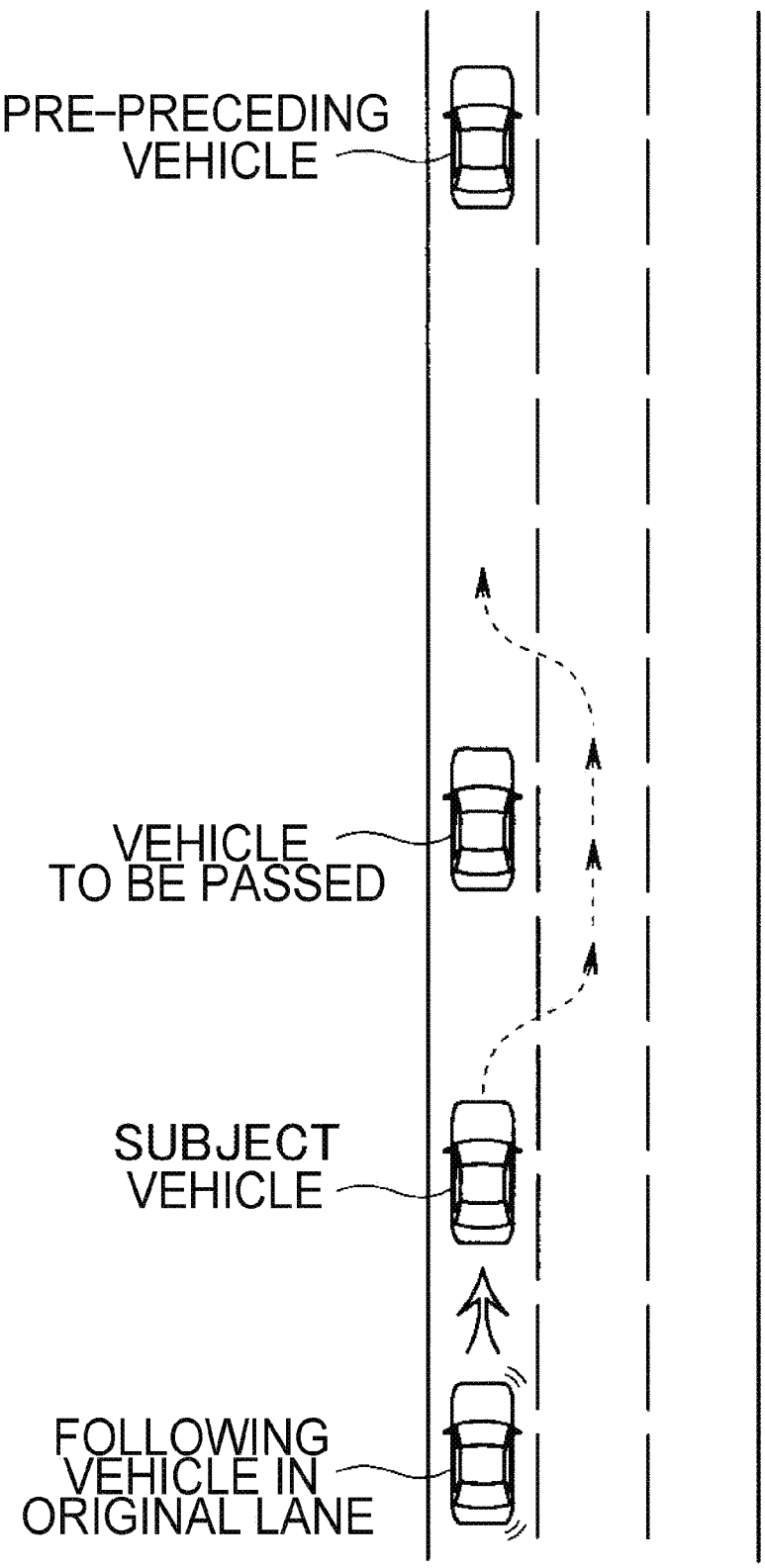
FIG. 8 is an illustrative diagram of travel control during monitoring of a following vehicle in the original lane, in the lane changing for passing start and first-stage acceleration in FIG. 3, according to the example.

The travel control during monitoring of the following vehicle in the original lane, in the lane changing for passing start and the first-stage acceleration which are respectively performed in the phase P1 and the phase P2, will be described here with reference to the flowchart illustrated in FIG. 3 and to FIG. 8.

Firstly, in S201, it is determined whether or not the phase P1 is in progress (whether or not Fp1=1). If the phase P1 is determined to be in progress (Fp1=1), the travel control unit 10 jumps to S203, whereas if the phase P1 is determined not to be in progress (Fp1=0), the travel control unit 10 advances to S202 where it is determined whether or not the phase P2 is in progress (whether or not Fp2=1).

If the phase P2 is determined to be in progress (Fp2=1), the travel control unit 10 advances to S203. If the phase P2 is determined not to be in progress (Fp2=0; in other words, neither the phase P1 nor the phase P2 is in progress), the travel control unit 10 exits the routine.

When the travel control unit 10 determines that the phase P1 or the phase P2 is in progress and advances to S203, the relative velocity change (dVR_D1/dt) of the following vehicle in the original lane with respect to the subject vehicle is compared with an approach determination value (dVR_Sn/dt) set previously on the basis of experimentation or calculation, etc.

If, as a result of this comparison, the relative velocity change of the following vehicle in the original lane with respect to the subject vehicle (dVR_D1/dt) is equal to or greater than the approach determination value (dVR_Sn/dt), and thus it is determined that the following vehicle in the original lane is accelerating greatly and is approaching the subject vehicle, the travel control unit 10 jumps to S205. Conversely, if the relative velocity change of the following vehicle in the original lane with respect to the subject vehicle (dVR_D1/dt) is smaller than the approach determination value (dVR_Sn/dt), and thus it is not determined that the following vehicle in the original lane is accelerating greatly and is approaching the subject vehicle, the travel control unit 10 advances to S204.

In S204, it is determined whether or not the following vehicle in the original lane has a turn-signal lamp blinking in the same direction as the lane changing by the subject vehicle. If the turn-signal lamp is determined not to be blinking in the same direction as the lane changing of the subject vehicle, the travel control unit 10 exits the routine without any change, and the travel control program illustrated in FIG. 2 is continued.

If it is determined that the following vehicle in the original lane has a turn-signal lamp blinking in the same direction as the lane changing of the subject vehicle, the travel control unit 10 advances to S205.

When advancing to S205 from S203 or S204, in order to notify the driver that the following vehicle in the original lane is approaching, a visual warning is issued with a display panel, monitor or alarm lamp of the display device 24, or an audible warning is issued with the speaker/buzzer 25, or a notification is issued by causing the steering wheel to vibrate by the steering control device 23. Furthermore, if the steering control device 23 has a lane keeping control function, lane keeping control is implemented so as to keep the vehicle traveling along the traveling lane (so as not to perform lane changing by passing control). Moreover, the automatic steering (lane changing) that is seeking to perform passing control is suspended.

Then, the travel control unit 10 advances to S206 to suspend the acceleration control which has been set for the purpose of passing maneuver control. More specifically, the target acceleration is set compulsorily to zero.

Figure 10:
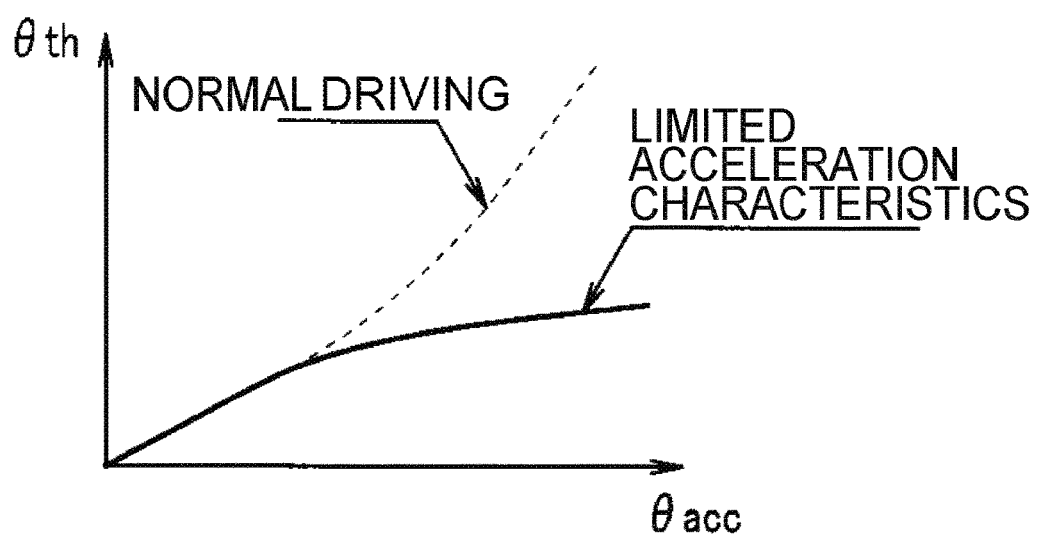
FIG. 10 is a diagram showing one example of a throttle opening degree with respect to an accelerator opening degree in which the acceleration characteristics are limited, according to the example.

Then, the travel control unit 10 proceeds to S207 to issue a visual warning with the display panel, monitor or alarm lamp of the display device 24, or an audible warning with the speaker/buzzer 25, so as to notify the driver with regard to the acceleration of the subject vehicle for lane changing. A characteristics map of the accelerator opening degree θacc/throttle opening degree θth in which the accelerator characteristics are limited to a greater extent compared to normal driving is set in the engine control device 21, as illustrated in FIG. 10, for example.

In the example, after issuing a warning about lane changing in S205, automatic steering is suspended, the acceleration control is suspended in S206, a warning about the acceleration of the subject vehicle is issued in S207, and the acceleration of the subject vehicle is limited. Alternatively, any one or any combination of these processes may be used.

In the example, the travel control unit 10 monitors the vehicle to be passed and the following vehicle in the original lane. When the subject vehicle performs lane changing in order to pass the vehicle to be passed and is in the phase P2 or phase P3, and the acceleration control relative to the vehicle to be passed is suspended, if the following vehicle in the original lane passes the subject vehicle and a predetermined distance can be ensured between the subject vehicle and the following vehicle in the original lane, behind the following vehicle in the original lane, the subject vehicle is allowed to return to the original lane behind the following vehicle in the original lane. Furthermore, when the following vehicle in the original lane is behind the subject vehicle by more than a predetermined distance and has a relative speed with respect to the subject vehicle that indicates that the subject vehicle and the following vehicle in the original lane are becoming distant from each other, the subject vehicle is allowed to return to the original lane in front of the following vehicle in the original lane.

Figure 4:
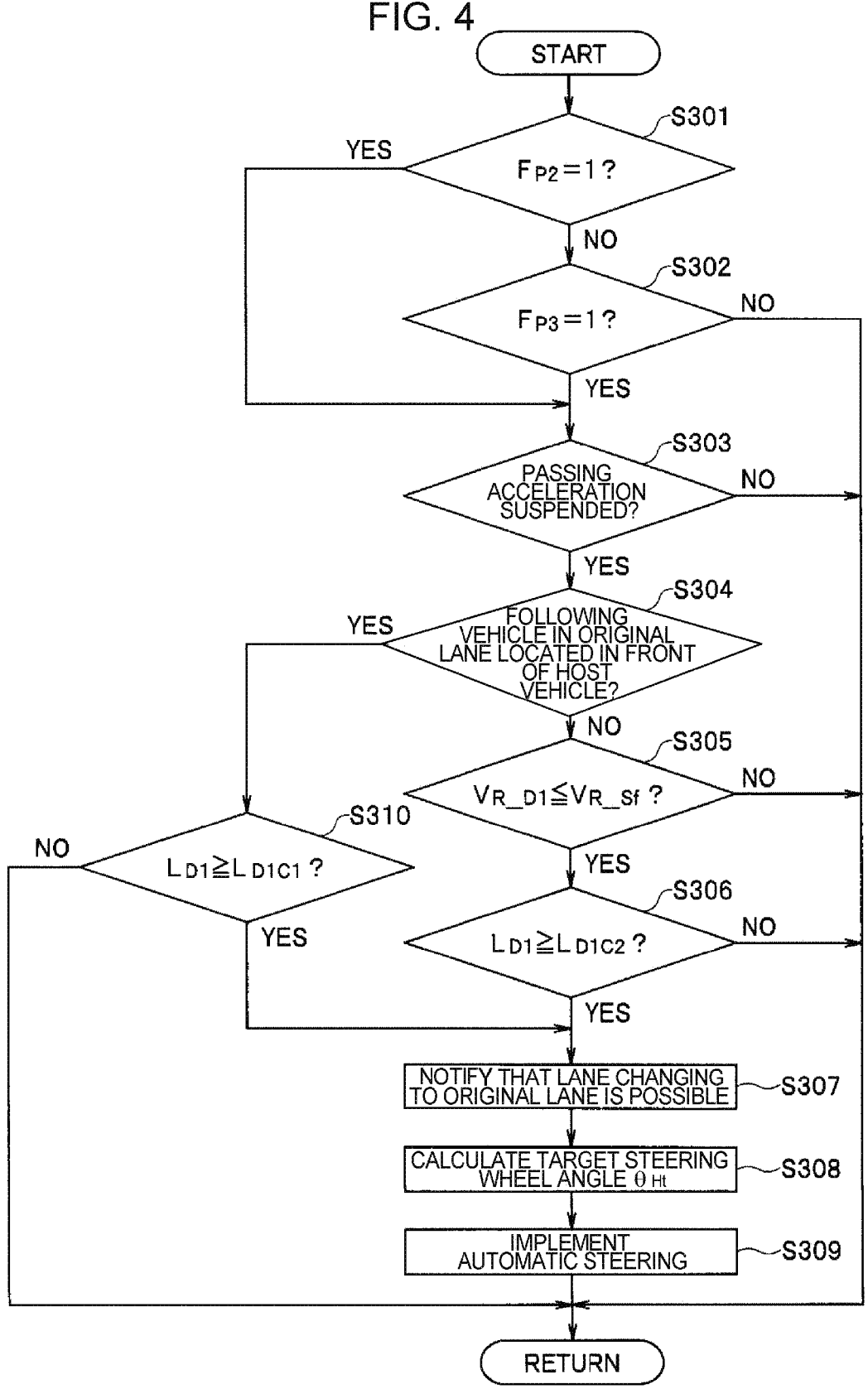
FIG. 4 is a flowchart of travel control during monitoring of a following vehicle in the original lane, in the first-stage acceleration and second-stage acceleration according to the example.

Hereinafter, the travel control during monitoring of the following vehicle in the original lane, in the first-stage and second-stage accelerations which are respectively performed in the phase P2 and the phase P3, will be described here with reference to the flowchart illustrated in FIG. 4 and to FIGS. 9A and 9B.

Firstly, in S301, it is determined whether or not the phase P2 is in progress (whether or not Fp2=1). If, the phase P2 is determined to be in progress (Fp2=1), the travel control unit 10 jumps to S303. If the phase P2 is not in progress (Fp2=0), the travel control unit 10 advances to S302 where it is determined whether or not the phase P3 is in progress (whether or not Fp3=1).

If, the phase P3 is determined to be in progress (Fp3=1), the travel control unit 10 advances to S303. If the phase P3 is not in progress (Fp3=0; in other words, neither the phase P2 nor the phase P3 is in progress), the travel control unit 10 exits the routine.

When the phase P2 is determined to be in progress or the phase P3 is determined to be in progress, and then the travel control unit 10 advances to S303, it is determined whether or not acceleration for passing has been suspended. If the acceleration has not been suspended, the travel control unit 10 exits the routine. If the acceleration for passing has been suspended, the travel control unit 10 proceeds to S304.

When it is determined in S303 that the acceleration for passing has been suspended and the travel control unit 10 advances to S304, it is determined whether or not the following vehicle in the original lane is located in front of the subject vehicle.

If the following vehicle in the original lane is determined not to be located in front of the subject vehicle, the travel control unit 10 advances to S305 to determine whether or not the following vehicle in the original lane has not passed the subject vehicle but rather is behind the subject vehicle, and a vehicle-to-vehicle distance between the subject vehicle and the following vehicle in the original lane is becoming longer. In other words, it is determined whether or not VR_D1≤VR_sf, where VR_sf is a predetermined moving-apart determination value of the relative speed with respect to the subject vehicle.

If VR_D1≤VR_sf, that is, it is determined in S305 that the following vehicle in the original lane has not passed the subject vehicle but rather is behind the subject vehicle and the vehicle-to-vehicle distance between the subject vehicle and the following vehicle in the original lane is becoming longer, the travel control unit 10 advances to S306. If, conversely, VR_D1>VR_sf, that is, it is determined that there is a possibility of the following vehicle in the original lane passing the subject vehicle, the travel control unit 10 exits the routine without any change.

When VR_D1≤VR_sf is determined in S305 and the travel control unit 10 advances to S306, it is determined whether or not the vehicle-to-vehicle distance LD1 between the subject vehicle and the following vehicle in the original lane is equal to or longer than a distance LD1$c$2 that is long enough for the subject vehicle to return to the original lane (whether LD1≥LD1$c$2). If LD1≥LD1$c$2, the travel control unit 10 advances to S307. Conversely, if LD1<LD1$c$2, that is, it is determined that there is not sufficient vehicle-to-vehicle distance (LD1$c$2) enough for the subject vehicle to return to the original lane, the travel control unit 10 exits the routine without any change.

Figure 9A:
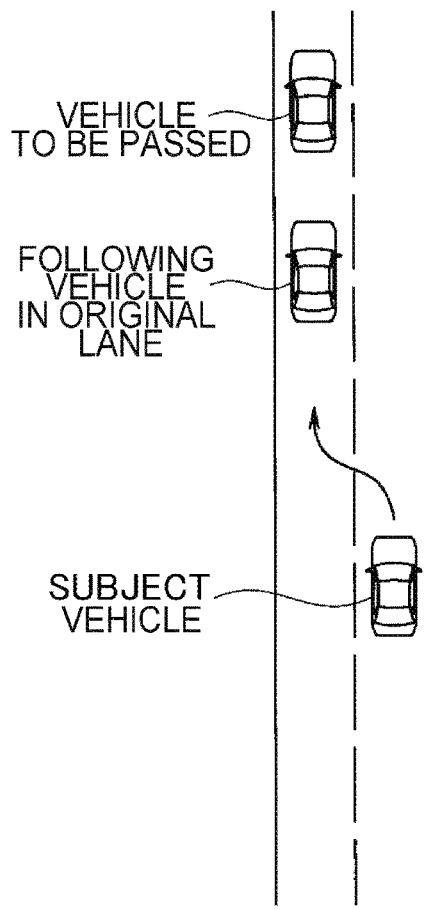
Figure 9B:
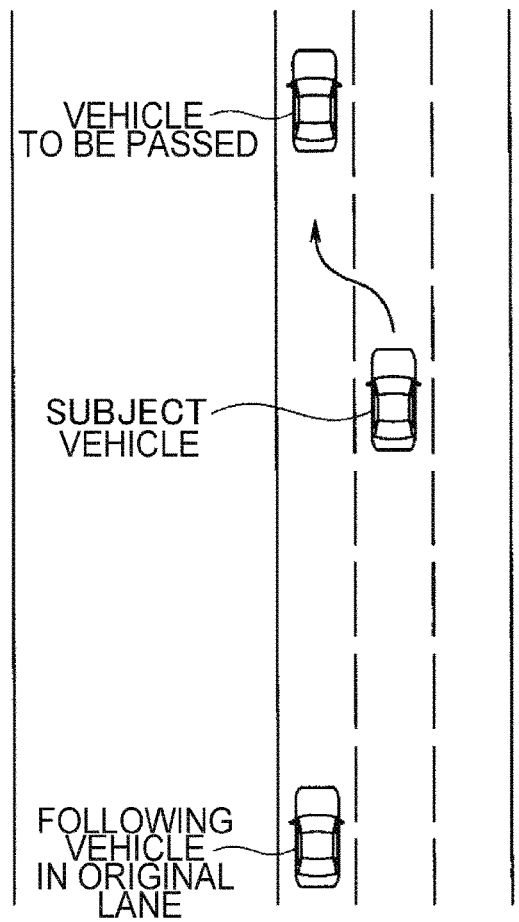

If it is determined in S306 that there is sufficient vehicle-to-vehicle distance (LD1$c$2) for the subject vehicle to return to the original lane and the travel control unit 10 advances to S307, a visual warning is issued with the display panel, monitor or alarm lamps of the display device 24, or an audible warning is issued with the speaker/buzzer 25, in order to notify the driver that the subject vehicle can return to the original lane along a travel trajectory such as that illustrated in FIG. 9B.

Then, the travel control unit 10 advances to S308 where the target steering wheel angle θHt is calculated on the basis of the current vehicle velocity, etc, using, for example, Equation (13) described above.

Then, the travel control unit 10 advances to S309 to output the target steering wheel angle θHt to the steering control device 23, and exits the routine.

On the other hand, when it is determined in S304 that the following vehicle in the original lane is located in front of the subject vehicle, the travel control unit 10 advances to S310 where it is determined whether or not the vehicle-to-vehicle distance LD1 between the subject vehicle and the following vehicle in the original lane is equal to or longer than a distance LD1$c$1 that is enough for the subject vehicle to return to the original lane (whether LD1≥LD1$c$1). If LD1≥LD1$c$1, the travel control unit 10 advances to S307. Conversely, if LD1<LD1$c$1, that is, it is determined that there is not sufficient vehicle-to-vehicle distance (LD1$c$1) for the subject vehicle to return to the original lane, then the travel control unit 10 exits the routine without any change.

If it is determined in S310 that there is sufficient vehicle-to-vehicle distance (LD1$c$1) for the subject vehicle to return to the original lane and the travel control unit 10 advances to S307, a visual warning is issued with the display panel, monitor or alarm lamps of the display device 24, or an audible warning is issued with the speaker/buzzer 25, in order to notify the driver that the subject vehicle can return to the original lane along a travel trajectory such as that illustrated in FIG. 9A.

Then, the travel control unit 10 advances to S308 where the target steering wheel angle θHt is calculated on the basis of the current vehicle velocity etc, using, for example, Equation (13) described above.

Then, the travel control unit 10 advances to S309 to output the target steering wheel angle θHt to the steering control device 23, and exits the routine.

In the example, after notifying that lane changing back to the original lane is possible in S307, the target steering wheel angle θHt is calculated in S308, and automatic steering is performed in S309. Alternatively, any one or any combination of these processes may be performed.

The travel control unit 10 monitors the vehicle to be passed and the following vehicle in the original lane, and continues acceleration control until the subject vehicle passes the vehicle to be passed and reaches a position ahead of the vehicle to be passed (principally, in the phase P2), and when the vehicle to be passed is positioned behind the subject vehicle and the vehicle-to-vehicle distance between the subject vehicle and the vehicle to be passed is becoming longer, implements control for limiting the acceleration control (principally, in the phase P3).

Figure 5:
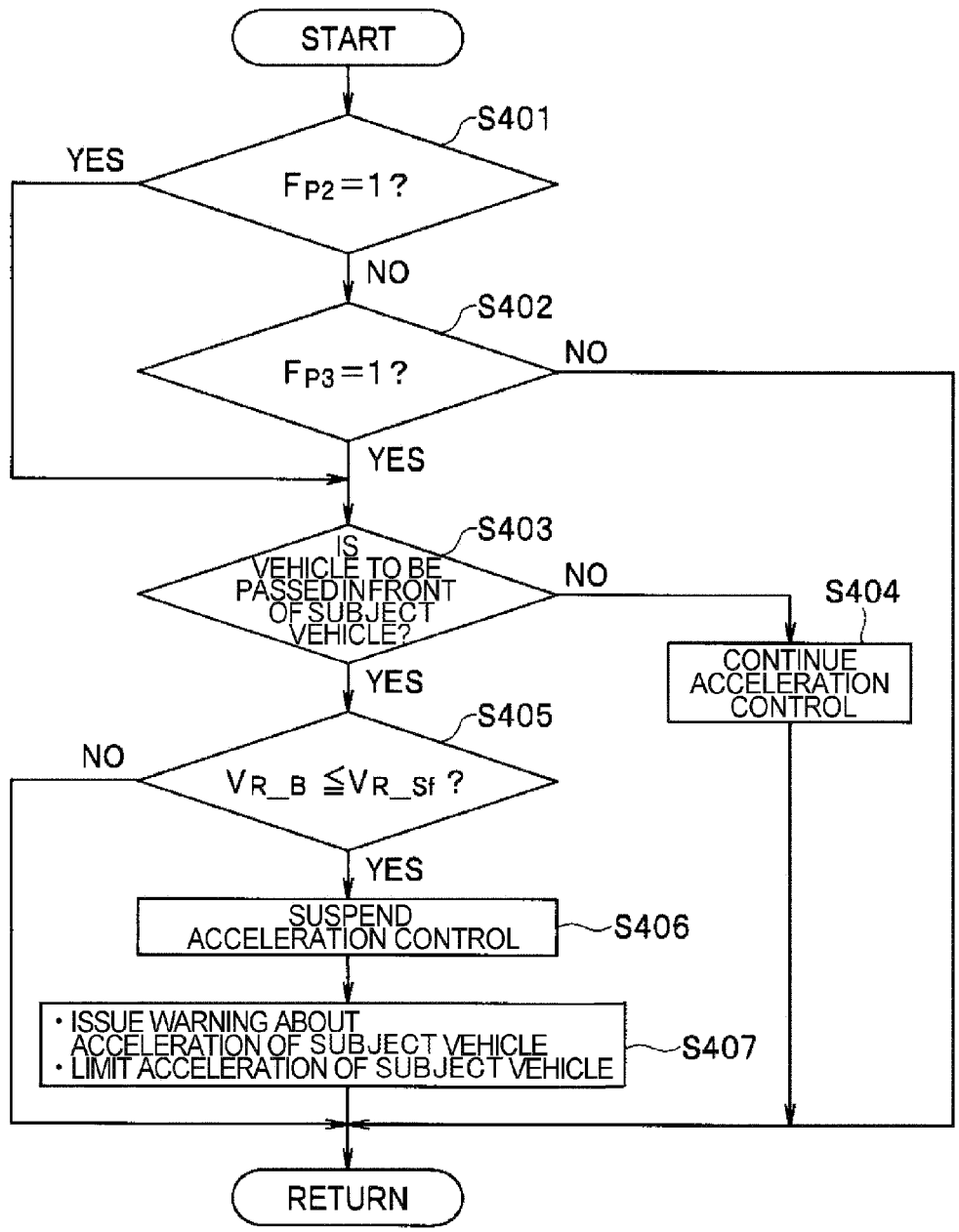
FIG. 5 is a flowchart of travel control during monitoring of a vehicle to be passed, in the first-stage and second-stage accelerations according to the example.

Below, the travel control during monitoring of the vehicle to be passed in the first-stage and second-stage accelerations, which are performed in the phase P2 and the phase P3 respectively, will be described with reference to the flowchart illustrated in FIG. 5.

Firstly, in S401, it is determined whether or not the phase P2 is in progress (whether or not Fp2=1). If the phase P2 is determined to be in progress (Fp2=1), then the travel control unit 10 jumps to S403. If the phase P2 is determined not to be in progress (Fp2=0), the travel control unit 10 advances to S402 where it is determined whether or not the phase P3 is in progress (whether or not Fp3=1).

If the phase P3 is determined to be in progress (Fp3=1), the travel control unit 10 advances to S403. If the phase P3 is determined not to be in progress (Fp3=0; in other words, neither the phase P2 nor the phase P3 is in progress), the travel control unit 10 exits the routine.

When the travel control unit 10 advances to S403 in the case of the phase P2 or the phase P3, it is determined whether or not the vehicle to be passed is located in front of the subject vehicle. If the vehicle to be passed is in front of the subject vehicle, the travel control unit 10 advances to S404 where the acceleration control is continued. In cases where the engine control device 21 has a plurality of acceleration characteristics, this acceleration control procedure selects suitable characteristics in accordance with the passing maneuver control.

Figure 11:
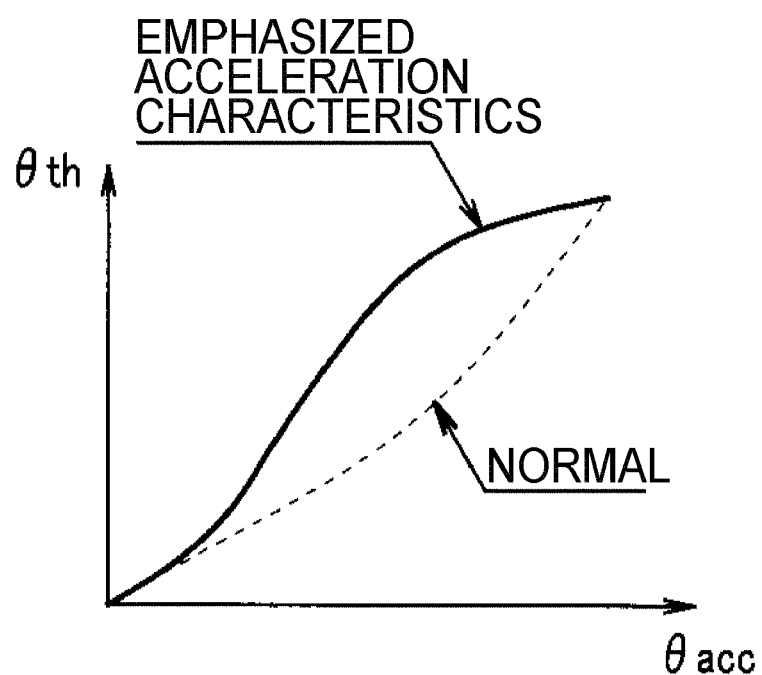
FIG. 11 is a diagram showing one example of a throttle opening degree with respect to an accelerator opening degree in which the acceleration characteristics are emphasized, according to the example.

For example, when it is possible to ensure a sufficient passing distance in accordance with the respective input signals descried above, or when the monitoring of the road environment finds that the vehicle is transferring from a flat road to a downhill slope as a result of the monitoring of the road environment, the acceleration characteristics that have already been selected are continued. Conversely, when it is not possible to ensure a sufficient passing distance (if the velocity Vf of the vehicle to be passed is fast when calculating the travel distance Lr based on the passing control described above, and the travel distance Lr based on the passing control is found to be equal to or greater than a predetermined distance, for instance, when the vehicle to be passed accelerates, or when there is a vehicle approaching from behind in the passing lane, etc.), or when the monitoring of the road environment finds that the road is an uphill slope the monitoring of the road environment, a good acceleration characteristic (see FIG. 11, for example) is selected. When the monitoring of the road environment finds that the road changes from a flat road to a downhill slope as a result of the monitoring of the road environment, the already selected acceleration characteristics are continued.

On the other hand, if, in S403, the vehicle to be passed is determined not to be located in front of the subject vehicle, the travel control unit 10 advances to S405 where it is determined whether or not the vehicle to be passed has not passed the subject vehicle but rather is behind the subject vehicle and a vehicle-to-vehicle distance between the subject vehicle and the vehicle to be passed is becoming longer, in other words, whether or not VR_B≤VR_sf.

If, in S405, VR_B≤VR_sf, and it is determined that the vehicle to be passed has not passed the subject vehicle but rather is behind the subject vehicle and the vehicle-to-vehicle distance between the subject vehicle and the vehicle to be passed is becoming longer, the travel control unit 10 advances to S406 to suspend the acceleration control for passing the vehicle to be passed, and then advances to S407 where a visual warning is issued by a display panel, monitor or alarm lamp of the display device 24, or an audible warning is issued by the speaker/buzzer 25, in order to notify the driver that acceleration for passing is to be suspended. A characteristics map of the accelerator opening degree θacc/throttle opening degree θth when the accelerator characteristics are limited is set in the engine control device 21, as illustrated in FIG. 10, for example.

Conversely, when VR_B>VR_sf and it is determined that there is a possibility that the vehicle to be passed may pass the subject vehicle, the travel control unit 10 exits the routine without any change.

In the example, the acceleration control is suspended in S406, a warning about the acceleration of the subject vehicle is issued in S407, and the acceleration of the subject vehicle is limited. Alternatively, any one or any combination of these processes may be used.

Furthermore, the travel control unit 10 monitors the vehicle to be passed and the following vehicle in the original lane. If the subject vehicle performs lane changing in order to pass the vehicle to be passed, and the P2 or the phase P3 is in progress, and if the vehicle-to-vehicle distance between the subject vehicle and the vehicle to be passed is becoming longer and it is determined that a predetermined space can be ensured in front of the vehicle to be passed, the subject vehicle is allowed to return to the original lane in front of the vehicle to be passed (implementation of the lane phase P4).

Figure 6:
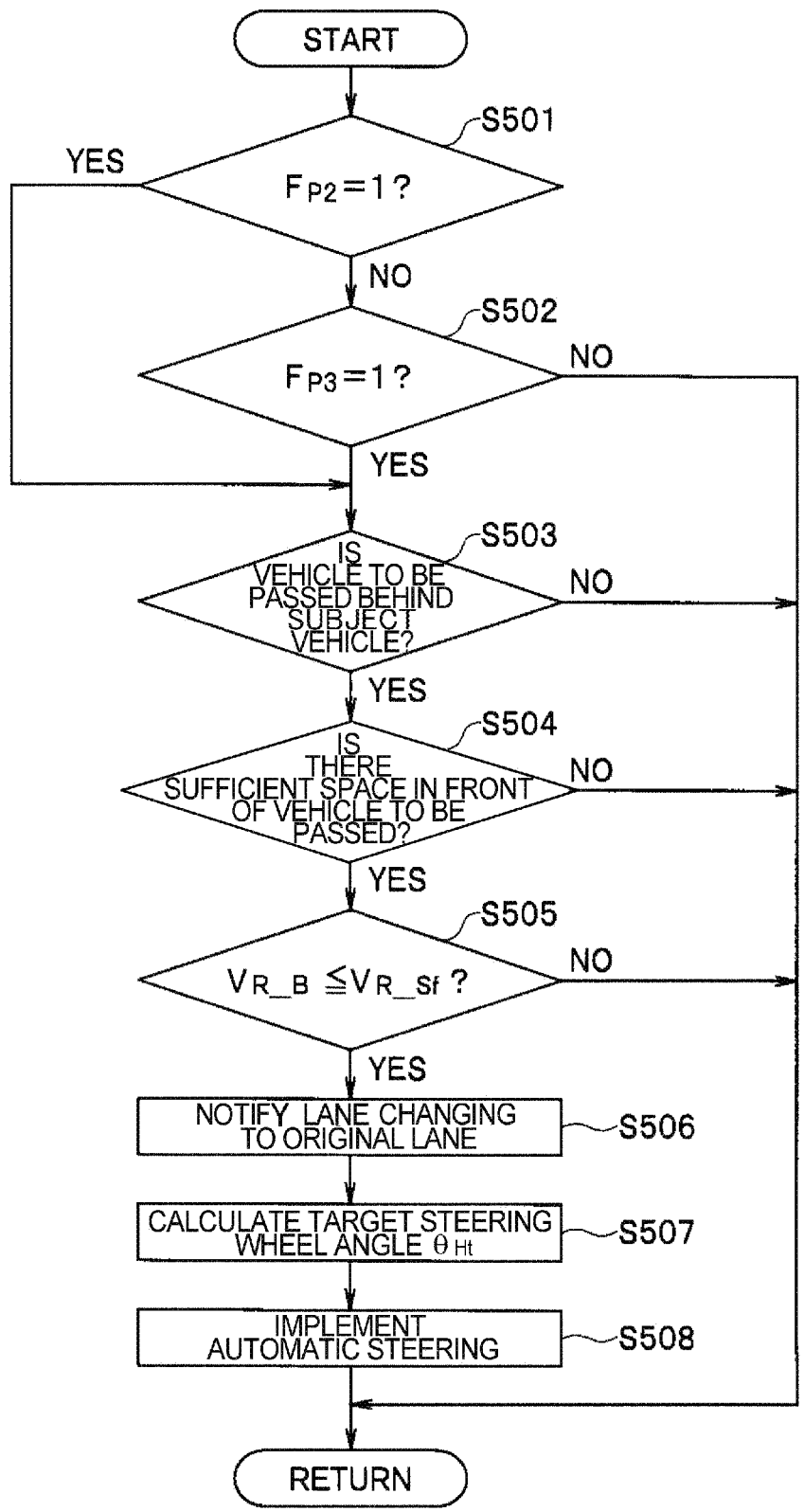
FIG. 6 is a flowchart of travel control during monitoring of the vehicle to be passed, in the second-stage acceleration and lane changing to the original lane, according to the example.

Below, the travel control during monitoring of the vehicle to be passed in the second-stage acceleration for passing and the lane changing to the original lane, which are performed in the phase P2 and the phase P3 respectively, is described with reference to the flowchart in FIG. 6.

Firstly, in S501, it is determined whether or not the phase P2 is in progress (whether or not Fp2=1). If the phase P2 is determined to be in progress (Fp2=1), the travel control unit 10 jumps to S503. If the phase P2 is determined not to be in progress (Fp2=0), the travel control unit 10 advances to S502 where it is determined whether or not the phase P3 is in progress (whether or not Fp3=1).

If the phase P3 is determined to be in progress (Fp3=1), the travel control unit 10 advances to S503. If the phase P3 is determined not to be in progress (Fp3=0; in other words, neither the phase P2 nor the phase P3 is in progress), the travel control unit 10 exits the routine.

When the travel control unit 10 advances to S503 in the case of the phase P2 or the phase P3, it is determined whether or not the vehicle to be passed is behind the subject vehicle. If the vehicle to be passed is behind the vehicle, the travel control unit 10 advances to S504 where it is determined whether or not there is space for the subject vehicle to return in front of the vehicle to be passed (the space being a predetermined distance: for example, when there is a preceding vehicle in front of the vehicle to be passed, the distance between the vehicle to be passed and the preceding vehicle).

If it is determined in S504 that there is space for the subject vehicle to return in front of the vehicle to be passed, then travel control unit 10 advances to S505 where it is determined whether or not the vehicle to be passed is behind the subject vehicle and rather than approaching the subject vehicle, a vehicle-to-vehicle distance between the subject vehicle and the vehicle to be passed is becoming longer, in other words, whether or not VR_B≤VR_sf.

If, in S505, VR_B≤VR_sf is determined, and it is determined that the vehicle to be passed is behind the subject vehicle and rather than approaching the subject vehicle, and the vehicle-to-vehicle distance between the subject vehicle and the vehicle to be passed is becoming longer, the travel control unit 10 advances to S506 where a visual warning is issued by the display panel, monitor or alarm lamps of the display device 24, or an audible warning is issued by the speaker/buzzer 25, in order to notify the driver about lane changing to the original lane on the travel trajectory such as the travel trajectory for phase P4 illustrated in FIG. 7.

Then, the travel control unit 10 advances to S507 where the target steering wheel angle θHt is calculated on the basis of the current vehicle velocity, using, for example, Equation (13) described above.

Then, the travel control unit 10 advances to S508 to output the target steering wheel angle θHt to the steering control device 23, and exits the routine.

On the other hand, if it is not determined in S503 that the vehicle to be passed is located behind the subject vehicle, or if, it is not determined in S504 that there is space for the subject vehicle to return in front of the vehicle to be passed, or if it is determined in S505 that VR_B>VR_sf and that the vehicle to be passed is behind the subject vehicle, and is approaching the subject vehicle, and the vehicle-to-vehicle distance between the subject vehicle and vehicle to be passed is becoming shorter, the travel control unit 10 exits the program without any change.

In the example, after reporting lane changing back to the original lane in S506, the target steering wheel angle θHt is calculated in S507, and automatic steering is performed in S508. Alternatively, any one or any combination of these processes may be performed.

As described above, the travel control unit 10 is provided with the functions of the peripheral environment recognition unit, the vehicle to be passed detection unit, the following vehicle in original lane detection unit and the passing control unit of the present invention in the example.

According to the example, a vehicle to be passed that is an object of passing and is located in front of the subject vehicle in the traveling lane thereof is detected on the basis of the peripheral environment information and travel information, a following vehicle that is behind the subject vehicle in the traveling lane thereof is detected as the following vehicle in the original lane, the vehicle to be passed and the following vehicle in the original lane are monitored, and a passing maneuver with respect to the vehicle to be passed is controlled variably on the basis of the monitoring results. More specifically, control is implemented to suspend the passing maneuver, in the cases where control for passing the vehicle to be passed has started (in the case of the phase P1), or where lane changing has been performed (in the case of the phase P2), and where at least either one of the following situations is detected: there is a large change in the relative velocity of the following vehicle in the original lane with respect to the subject vehicle, in the direction in which the following vehicle is approaching to the vehicle; and the following vehicle in the original lane intends to perform lane changing in the same direction as the subject vehicle performs lane changing in order to pass the vehicle to be passed. Furthermore, When the subject vehicle performs lane changing in order to pass the vehicle to be passed and is in the phase P2 or phase P3, and the acceleration control relative to the vehicle to be passed is suspended, if the following vehicle in the original lane passes the subject vehicle and the predetermined distance can be ensured between the subject vehicle and the following vehicle in the original lane, at the rear of the following vehicle in the original lane, the subject vehicle is allowed to return to the original lane behind the following vehicle in the original lane. Furthermore, when the following vehicle in the original lane is behind the subject vehicle by more than the predetermined distance and has a relative speed with respect to the subject vehicle that indicates that the subject vehicle and the following vehicle in the original lane are becoming distant from each other, the subject vehicle is allowed to return to the original lane in front of the following vehicle in the original lane. Furthermore, acceleration control is continued until the subject vehicle passes the vehicle to be passed and reaches a position ahead of the vehicle to be passed (principally, in the phase P2), and when the vehicle to be passed is positioned behind the subject vehicle and the vehicle-to-vehicle distance between the subject vehicle and the vehicle to be passed is becoming longer, control is implemented so as to limit the acceleration control (principally, in the phase P3). Furthermore, if the subject vehicle performs lane changing in order to pass the vehicle to be passed, and the phase P2 or the phase P3 is in progress, and if the vehicle-to-vehicle distance between the subject vehicle and the vehicle to be passed is becoming longer and it is determined that a predetermined space can be ensured in front of the vehicle to be passed, the subject vehicle is allowed to return to the original lane in front of the vehicle to be passed (implementation of the phase P4). Therefore, when implementing passing control using automatic driving technology, if it is desirable not to perform a passing maneuver, or if it is desirable for the vehicle to return to the original lane without passing the preceding vehicle, even after lane changing in order to implement passing, for instance, due to the traveling state of the following vehicle, this information is gathered appropriately and notified to the driver, or lane changing back to the original lane can be performed automatically.

The invention claimed is:

1. A travel control apparatus for a vehicle, comprising:
   one more of a stereo camera configured to capture images of an external environment of a vehicle or a radar configured to receive reflected waves from objects present in a periphery of the vehicle;
   a travel information detection unit that detects travel information on travel of the vehicle, including at least a velocity sensor;
   a controller configured to:
     recognize peripheral environment information on peripheral environment in which a vehicle equipped with the travel control apparatus is traveling, based on information from the one more of a stereo camera or a radar; detect a vehicle to be passed on the basis of the peripheral environment information and the travel information, the vehicle to be passed being a target of passing located in front of the vehicle in a traveling lane thereof;
     detect a following vehicle behind the vehicle in the traveling lane, as a following vehicle in an original lane, on the basis of the peripheral environment information, the original lane being the traveling lane;
     monitor the vehicle to be passed and the following vehicle in the original lane, and variably control a passing maneuver with respect to the vehicle to be passed, on the basis of a monitoring result; and
   a notification unit that issues a notification about a control status, wherein the notification unit includes one or more of a display device configured to display a visual notification and a speaker configured to issue an audible notification,
   wherein the controller is configured to implement return control by a steering controller to return to the original lane in front of the vehicle to be passed, after passing the vehicle to be passed by changing the traveling lane of the vehicle.

2. The travel control apparatus for a vehicle according to claim 1, wherein in at least either one of the case where passing control with respect to the vehicle to be passed has been started and the case where lane changing has been made for the purpose of passing control, the controller is configured to implement control for suspending the passing maneuver, when at least either one of the followings is detected: there is a large change in the relative speed of the following vehicle in the original lane with respect to the vehicle in a direction in which the following vehicle is approaching to the vehicle; and the following vehicle in the original lane intends to perform lane changing in the same direction as the direction of lane changing that the vehicle performs in order to pass the vehicle to be passed.

3. The travel control apparatus for a vehicle according to claim 2, wherein the control for suspending the passing maneuver is at least either one of control for limiting acceleration control, and suspension of lane changing control that a steering controller performs in order to pass the vehicle to be passed by.

4. The travel control apparatus for a vehicle according to claim 1, wherein in the case where the vehicle performs lane changing in order to pass the vehicle to be passed and then substantially suspends acceleration control with respect to the vehicle to be passed, the controller is allowed to implement return control by the steering controller to return to the original lane behind the following vehicle in the original lane, when the following vehicle in the original lane passes the vehicle and it is possible to ensure a predetermined distance between the vehicle and the following vehicle in the original lane.

5. The travel control apparatus for a vehicle according to claim 2, wherein in the case where the vehicle performs lane changing in order to pass the vehicle to be passed and then substantially suspends acceleration control with respect to the vehicle to be passed, the controller is allowed to implement return control by the steering controller to return to the original lane behind the following vehicle in the original lane, when the following vehicle in the original lane passes the vehicle and it is possible to ensure a predetermined distance between the vehicle and the following vehicle in the original lane.

6. The travel control apparatus for a vehicle according to claim 3, wherein in the case where the vehicle performs lane changing in order to pass the vehicle to be passed and then substantially suspends acceleration control with respect to the vehicle to be passed, the controller is allowed to implement return control by the steering controller to return to the original lane behind the following vehicle in the original lane, when the following vehicle in the original lane passes the vehicle and it is possible to ensure a predetermined distance between the vehicle and the following vehicle in the original lane.

7. The travel control apparatus for a vehicle according to claim 1, wherein in the case where the vehicle performs lane changing in order to pass the vehicle to be passed and substantially suspends acceleration control with respect to the vehicle to be passed, the controller is allowed to implement return control by the steering controller to return to the original lane in front of the following vehicle in the original lane, when the following vehicle in the original lane is behind the vehicle by more than a predetermined distance and the relative speed of the following vehicle in the original lane with respect to the vehicle indicates that between the vehicle and the following vehicle in the original lane are becoming distant from each other.

8. The travel control apparatus for a vehicle according to claim 2, wherein in the case where the vehicle performs lane changing in order to pass the vehicle to be passed and substantially suspends acceleration control with respect to the vehicle to be passed, the controller is allowed to implement return control by the steering controller to return to the original lane in front of the following vehicle in the original lane, when the following vehicle in the original lane is behind the vehicle by more than a predetermined distance and the relative speed of the following vehicle in the original lane with respect to the vehicle indicates that between the vehicle and the following vehicle in the original lane are becoming distant from each other.

9. The travel control apparatus for a vehicle according to claim 3, wherein in the case where the vehicle performs lane changing in order to pass the vehicle to be passed and substantially suspends acceleration control with respect to the vehicle to be passed, the controller is allowed to implement return control by the steering controller to return to the original lane in front of the following vehicle in the original lane, when the following vehicle in the original lane is behind the vehicle by more than a predetermined distance and the relative speed of the following vehicle in the original lane with respect to the vehicle indicates that between the vehicle and the following vehicle in the original lane are becoming distant from each other.

10. The travel control apparatus for a vehicle according to claim 1, wherein the controller is configured to continue acceleration control until the vehicle passes the vehicle to be passed and reaches a position ahead of the vehicle to be passed, and implement control for limiting the acceleration control when the vehicle to be passed is positioned behind the vehicle and a vehicle-to-vehicle distance between the vehicle and the vehicle to be passed becomes longer.

11. The travel control apparatus for a vehicle according to claim 2, wherein the controller is configured to continue acceleration control until the vehicle passes the vehicle to be passed and reaches a position ahead of the vehicle to be passed, and implement control for limiting the acceleration control when the vehicle to be passed is positioned behind the vehicle and a vehicle-to-vehicle distance between the vehicle and the vehicle to be passed becomes longer.

12. The travel control apparatus for a vehicle according to claim 3, wherein the controller is configured to continue acceleration control until the vehicle passes the vehicle to be passed and reaches a position ahead of the vehicle to be passed, and implement control for limiting the acceleration control when the vehicle to be passed is positioned behind the vehicle and a vehicle-to-vehicle distance between the vehicle and the vehicle to be passed becomes longer.

13. The travel control apparatus for a vehicle according to claim 1, wherein the controller is allowed to implement return control by the steering controller to return to the original lane in front of the vehicle to be passed, when the vehicle-to-vehicle distance between the vehicle and the vehicle to be passed becomes longer and determination is made that it is possible to ensure a predetermined space in front of the vehicle to be passed.

14. The travel control apparatus for a vehicle according to claim 2, wherein the controller is allowed to implement return control by the steering controller to return to the original lane in front of the vehicle to be passed, when the vehicle-to-vehicle distance between the vehicle and the vehicle to be passed becomes longer and determination is made that it is possible to ensure a predetermined space in front of the vehicle to be passed.

15. The travel control apparatus for a vehicle according to claim 3, wherein the controller is allowed to implement return control by the steering controller to return to the original lane in front of the vehicle to be passed, when the vehicle-to-vehicle distance between the vehicle and the vehicle to be passed becomes longer and determination is made that it is possible to ensure a predetermined space in front of the vehicle to be passed.

* * * * *